Patented May 27, 1924.

1,495,734

UNITED STATES PATENT OFFICE.

GEORGE GRINDROD, OF OCONOMOWOC, WISCONSIN, ASSIGNOR TO CARNATION MILK PRODUCTS COMPANY, OF CHICAGO, ILLINOIS, A CORPORATION OF DELAWARE.

PROCESS OF PRODUCING EDIBLE FAT.

No Drawing. Original application filed May 12, 1919, Serial No. 296,691. Divided and this application filed December 30, 1919. Serial No. 348,404.

*To all whom it may concern:*

Be it known that I, GEORGE GRINDROD, a citizen of the United States, and a resident of Oconomowoc, in the county of Waukesha and State of Wisconsin, have invented a new and useful Process of Producing Edible Fat, of which the following is a specification.

The invention has for its object to produce a new food product in the nature of a butter substitute which will be edible, free from toxic constituents and from rancidity-producing constituents, a food product which will remain stable, so that it may be used for household purposes to the same extent as ordinary butter. The invention has further for its object to provide an improved process of making butter substitutes which will be hereinafter fully described.

In the carrying out of my improved process which I will now describe by way of illustration, I proceed as follows:

I secure the desired quantity of fresh whole milk. Instead of fresh whole milk I contemplate also using a suitable quantity of fresh skim milk, (ordinary skim milk provided it is fresh skim milk or that coming from a separator). I contemplate also, as an alternative, the use of fresh buttermilk such as comes from the churn in the churning of fresh butter. Having provided the necessary quantity of milk, by which I mean either fresh whole milk or fresh skim milk or fresh separated milk or fresh buttermilk, I emulsify the quantity of milk with an edible vegetable fat, preferably the one hereinbefore described, so as to bring about a temporary emulsion of the milk constituents and the vegetable fat. Prior to emulsifying the vegetable fat with the milk constituents, I cause the milk to be heated to about 35° C., and also bring about the heating of the fat to about the same temperature, this vegetable fat being in liquid state while it is being added to the milk constituents. I provide initial mixture in one preferred form by means of an aspirator so that the milk constituents and vegetable fat are sucked together through the aspirator and thereby bring about an intimate intermixing of the milk constituents and the vegetable fat. However, other forms of intermixing milk constituents and vegetable fat may be employed. This initial mixture is then homogenized by means of a homogenizing machine, the initial mixture passing through the homogenizing machine at about the same temperature, namely, about 35° C. The action of the homogenizing machine upon the milk constituents and the vegetable fat brings about a temporary emulsion. I then subject this temporary emulsion to a temperature of about 140° F. for the purpose of partially stabilizing it, and so that the temporary emulsion will be maintained as an emulsion, that is, without the fat being separated from the milk constituents for a reasonable length of time, at least long enough to carry out the further steps of the process. The temporary and partially stabilized emulsion thus obtained is then subjected to either one of two intermixing methods mentioned.

Before it is subjected to either one of these processes, it is subjected to a cooling action, thereby passing it over cooling coils, or in any other suitable manner, so as to obtain a reasonably rapid cooling other than mere standing, as mere standing might bring about acid and that would be disadvantageous. This cooled and partially stabilized emulsion is then subjected to either one of two processes. In the one method it is ripened in the manner well-known to the butter art, that is, by the addition of a lactic acid starter. This ripened temporary emulsion, partially stabilized, is then subjected to a churning action for the purpose of churning out the fat into the butter substitute. The other method is to use the temporary emulsion partially stabilized in its fresh condition, that is, not to subject it to any ripening, but to immediately subject it to the churning action, in order to churn out the butter and produce a butter substitute or what I will term a fresh butter substitute in a manner similar to the production of a fresh unripened butter.

In the methods I have heretofore described I use the following proportions of milk constituents and vegetable fat: Between the limits of 20% and 40% of vegetable fat in the temporary emulsion, and the end product having from 80% to 90% fat after churning.

In another embodiment of my process I proceed by first adding to the milk of the kinds described, and work with such percentage of vegetable fat, preferably 3% to 5%, that the temporary emulsion will have about the composition of average fresh cow's milk. I then subject this milk to a separator action, preferably of a centrifugal type and separate the cream from the milk. This cream is then either ripened or churned fresh into the butter substitute containing approximately 85% vegetable fat. In both forms of my process I bring about a temporary emulsion by homogenization and then partially stabilize it by subjecting the emulsion to a temperature of about 140° F., and, as stated, either ripen it or not, and then churn the fat into a butter substitute.

I have described above the use of a vegetable fat and I have obtained very satisfactory results with edible cocoanut fat free from free fatty acids, that is, to the extent of 0.2 of 1% or 0.25 of 1%. Corn oil, palm oil, and peanut oil may also be used and emulsified and partially stabilized in the manner described and then subjected to the churning methods described.

As another embodiment of my invention, I combine the above-mentioned milk, either fresh milk or skim milk or buttermilk of the kinds described with an edible vegetable fat free from aldehydes, ketones and hydroxy fats and other rancidity-producing substances, which fat is non-toxic and stable, and is not subjected to spontaneous decomposition. This fat does not contain toxic constituents but has oleic glycerides unhydrogenated. It has a melting point of less than 37.5° C. It is distinct from vegetable fats used heretofore in the manufacture of butter substitutes in that it is stabilized against the production of rancidity in the finished product. It is distinct from vegetable fats heretofore used in the preparation of butter substitutes in that it is more stable against rancidity than these fats heretofore used and is even more stable than butter fat. It is more stable than butter fat under any given conditions such as temperature, exposure to light, presence of moisture, exposure to air and presence of bacterial enzymes. It is also entirely free from rancidity, whether due to plant compounds or to fat decomposition products. It is distinct from hydrogenated fats heretofore manufactured and used in butter substitutes in that it contains most of the oleic glyceride of the original vegetable fat in untransformed condition.

In accordance with either of the two processes described by me heretofore, or other processes heretofore known to the art used for making butter substitutes, and in the carrying out of the processes heretofore described by me with this new fat, I obtain a butter substitute which contains milk constitutents and this new fat, so that a butter substitute is produced which is free from rancidity-producing constituents and free from toxic substances. This finished product is distinct from butter substitute heretofore produced in that it has no flavor due to the substituted vegetable fat. It has no toxic substances as ordinarily carried with vegetable fats and which decrease the assimilability of the product. It has no rancidity as has been common with butter substitutes heretofore produced from vegetable fats. It has no odor of the vegetable fat. It contains no fat compounds or other compounds capable of decomposing on contact with the milk and water into flavors, odors or rancidity under ordinary storage or shipping conditions. This last is one of the chief distinguishing features between this product and butter fat substitutes made with vegetable fats heretofore. This product is distinct from butter substitutes made heretofore in that it is more stable and keeps under given storage conditions longer than whole milk butter.

In the emulsification processes I have described, as in the manipulation of the processes which also include the stabilizing and cooling, I so manipulate the constituents that the globules of the milk and the globules of the vegetable fat remain of a size equivalent to that in butter manufactured from whole cows' milk.

Heretofore in the manufacture of butter substitutes the resulting product has not had the same consistency or body as butter manufactured from cows' milk. This has been due to the fact that the emulsification processes used did not reduce the fat to a globular size as small as the fat globules existing in cows' milk, but emulsified the fat by various churning operations which leave the fat in globules several times the size of those existing in normal cows' milk. This has caused the products so produced to be of a consistency more like lard or grease and to fail to have the peculiar hard body and consistency of butter made from cows' milk. In my improved products I have a fat globular structure which is much finer than that existing in substitute butters heretofore produced. The butter substitutes heretofore produced by processes leaving the globules of fat and milk constituents larger than cows' milk butter have caused the products to be less palatable and undesirable and to an extent less acceptable than they would have been had they had the same consistency as butter. The combination of milk constituents with my improved fat bring about a specially improved product.

Reference is herewith made to my pending application Serial No. 296,691, filed May 12, 1919, of which this is a divisional application.

In this application, I have disclosed the process for removing the toxic substances from the substituted fat. As one example of this process which may be employed in connection with my present invention, I provide an ordinary standard autoclave equipped with a circulating injector. Edible cocoanut fat, purified by standard methods known to the art and substantially neutralized to about two tenths per cent (0.2%) free fatty acids, is placed within the autoclave, the cocoanut fat being first melted so that it enters the autoclave in liquid condition. Instead of using the neutralized edible cocoanut fat just referred to, it is possible to utilize a cheaper grade of edible cocoanut fat which has not been neutralized to the same extent as heretofore stated. After introduction of the fat into the autoclave it is treated therein for a period from two to three hours and is subjected to hydrogenation under a pressure of about 250 to about 600 pounds at a temperature under 120° C. Various alternative methods may be used in this step of the process as, for instance, the pressure may be constant at 250 pounds and the temperature may be varied and advanced from 70° C. to a maximum of 120° C. In other cases, the pressure may be maintained at 600 lbs. and the temperature maintained constant at from 70° to 80° C.

The purpose of utilizing the high pressure is to carry out the process within a practical time limit, it being a well-established law of hydrogenation that the rate of action of whatever hydrogenation takes place varies as the pressure or density of the hydrogen. The function of the pressure at which the process is carried out is to provide a means of differentiating between the incomplete vegetable fats, ketones and aldehydes and the normal but unsaturated vegetable fats. In the art of hydrogenation as heretofore employed it has been well known that the rate of hydrogenation of such normal unsaturated fats as oleic glyceride is very slow at temperatures below 185° C., and is hardly appreciable at much lower temperatures. Temperatures as low as 120° C. have never been employed in the art for the purpose of hydrogenating normal unsaturated fats, but I have found that aldehydes and other rancidity and odor-producing compounds, as carried with nearly all vegetable fats, are readily decomposed by hydrogen at very low temperatures, that is, between 70° C. and 120° C. I have also found that the valuable fat compounds of butter are incapable of withstanding temperatures as high as those used in the ordinary hydrogenation processes. The process which I employ is, therefore, designed to protect from destruction or hydrogenation, those more delicate compounds which occur both in butter and in the vegetable fat to be treated. I have found that the use of a low temperature, such as a temperature below the destruction or hydrogenation point of such fat compounds will result in the destruction of the vegetable toxins and partially-formed vegetable fats without destruction or transformation of the more delicate butterlike compounds or normal unsaturated fats which it is desired to leave largely unaffected. I have also found that the vegetable aldehydes, ketones and other rancidity-producing compounds are completely and instantly destroyed at 70° C., the period of time required for this reaction has been found to be only a few seconds. While the rancidity-producing compounds, aldehydes and ketones are destroyed very quickly at 70° C. the transformation of the other hydroxy fats does not take place so quickly and it is necessary to extend the time of hydrogenation somewhat in order to stabilize the fat against the reformation of rancidity compounds. In practice, it is frequently more convenient to use a temperature somewhat higher than 70° C. since reactions are thus caused to take place more quickly. At a low temperature, 70° C. for instance, the differentiation between the action of the hydrogen on the aldehydes and on the fats is very marked. If a portion of cocoanut oil is heated to 120° C. for a few minutes, it will develop aldehydes very distinctly and give a plain color reaction for aldehydes. If this oil is then cooled to 70° and a portion of nickel catalyst freshly prepared and so containing a little absorbed hydrogen is stirred into it, the aldehydes will be completely and instantly decomposed and the oil will give no further test for them. The oil will also have lost its rancid odor. But analysis of the oil before and after its insertion shows no change whatever in the oleic constituents. Also the incomplete or hydroxy fats are not found to be materially reduced so that the oil will regenerate the various rancid compounds and reform aldehydes if again heated to 120 C. Then if this same oil is subjected to hydrogenation with a catalyst for a period of one hour under 300 pounds pressure at 90° C., it will be found to be deodorized and further, will be found to be stable against heat so that again heating it to 120° C. will not regenerate aldehydes unless the heating be prolonged to, say, two hours. But this oil is free from hydroxy fats which are known to be one of the compounds capable of reproducing rancidity, and at the same time, the oelic glyceride is found unchanged to any measurable extent. Thus it is apparent that the selective action of the hydrogen is a positive fact. For the removal of the hydroxy fats so that rancidity will not be reproduced, appreciable time has been found necessary, but in so far as it is possible to determine experimentally, the destruction of the hydroxy fats or rancidity-causing compounds is complete before the hydrogenation of the normal unsaturated fats has proceeded to a measurable extent. When the temperature is kept below 120° C., the hydrogenation is continued until the incomplete fats are found to be fully transformed, which is determined practically by measuring the rate of decomposition of the fat at suitable temperatures.

When the fat is found to be stable against heat, the incomplete fats are known to be destroyed or transformed. By the expression "incomplete fats" is meant, fats such as hydroxy fats or fats which are not completely formed into normal fats. In these fats, for instance, hydroxy radical exists in place of a fatty acid radical and thus the molecule is not completely formed into a complete molecule. When the fat is thus found to be stable against heat, the transformation of the normal unsaturated fat is not appreciable and the change in melting point and iodine number is small and may be attributed to the hydrogenation of the non-fat compounds or the incomplete or hydroxy fats. The change in iodine value and in melting point which is found to occur is due chiefly to the transformation of the non-fat vegetable compounds and the incomplete or hydroxy fats. At the temperature employed, transformation of normal or unsaturated fats is very slight and generally not appreciable and these fats are substantially unhydrogenated. By thus selectively hydrogenating the constituent elements of the vegetable fat, the product becomes free from vegetable toxins and rancidity-producing compounds and stabilizes against reformation of them.

Further, by reason of this selective hydrogenation, a fat is obtained which has a melting point below 34° C. and that usually obtained has a melting point of approximately 35° C. or about the melting point of butter.

From the foregoing description, the nature of my present invention and the manner in which the same may be successfully practiced will be clearly and fully understood. It is to be understood that the process is susceptible to some variations. I therefore reserve the privilege of resorting to all such legitimate changes in practice as may be fairly comprehended within the spirit and scope of the invention and the appended claims.

I claim:

1. The process of making a butter substitute which consists in temporarily emulsifying milk constituents with a vegetable fat, then partially stabilizing the emulsion and then churning the emulsion.

2. The process of making a butter substitute which consists in temporarily emulsifying milk constituents with a vegetable fat, stabilizing the emulsion by subjecting it to a temperature of about 140° F., cooling the emulsion and then churning the emulsion.

3. The process of making a butter substitute which consists in mixing a vegetable fat with milk constituents in the proportion of fat in average cow's milk, then temporarily emulsifying the same, then partially stabilizing the same, then separating the cream, and churning the cream.

4. The process of making a butter substitute which consists in mixing a vegetable fat with milk constituents in the proportion of fat in average cow's milk, then temporarily emulsifying the same, then partially stabilizing the same by subjecting the emulsion to a temperature of about 140° F., then separating the cream, and churning the cream.

5. The process of making a butter substitute which consists in incorporating cocoanut oil free of toxic constituents in cow's milk, partially stabilizing the mixture by heating the same to approximately 140 F°., and then churning the partially stabilized mixture.

6. The process of producing an emulsion of milk and a substituted vegetable fat which consists in intimately mixing the milk and fat at a comparatively low temperature and homogenizing the mixture at that temperature, and then advancing the temperature of the homogenized mixture until the emulsified constituents thereof are partially stabilized.

7. The process of making a butter substitute which consists in temporarily emulsifying a vegetable oil substantially free of toxic constituents with cow's milk and while maintaining the emulsified condition of the constituents, subjecting the mixture to the action of heat until the constituents thereof are partially stabilized, and then churning the partially stabilized mixture.

In testimony that I claim the foregoing as my invention, I have signed my name hereunder.

GEORGE GRINDROD.